(12) United States Patent
Nagano et al.

(10) Patent No.: US 11,703,819 B2
(45) Date of Patent: Jul. 18, 2023

(54) UNIT SPACE UPDATE DEVICE, UNIT SPACE UPDATE METHOD, AND PROGRAM

(71) Applicant: Mitsubishi Power, Ltd., Kanagawa (JP)

(72) Inventors: Ichiro Nagano, Yokohama (JP); Mayumi Saito, Tokyo (JP); Keiji Eguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/278,799

(22) PCT Filed: Nov. 5, 2019

(86) PCT No.: PCT/JP2019/043316
§ 371 (c)(1),
(2) Date: Mar. 23, 2021

(87) PCT Pub. No.: WO2020/091077
PCT Pub. Date: May 7, 2020

(65) Prior Publication Data
US 2022/0026866 A1    Jan. 27, 2022

(30) Foreign Application Priority Data
Nov. 2, 2018 (JP) .................................. 2018-207490

(51) Int. Cl.
*G05B 19/042* (2006.01)
(52) U.S. Cl.
CPC .... *G05B 19/042* (2013.01); *G05B 2219/2639* (2013.01)
(58) Field of Classification Search
None
See application file for complete search history.

(56) References Cited

U.S. PATENT DOCUMENTS 7,203,431 B2 * 4/2007 Shoji .................. G06F 11/0754
399/9
7,525,443 B2 * 4/2009 Littrell ............... G05B 23/0235
318/434

(Continued)

FOREIGN PATENT DOCUMENTS

CN    102859457 B * 11/2015 ......... G05B 23/0264
JP    2007-011686           1/2007

(Continued)

OTHER PUBLICATIONS

Hsu et al., "An adaptive forecast-based chart for non-gaussian processes monitoring: with application to equipment malfunctions detection in a thermal power plant", IEEE Transactions on control systems technology vol. 19 No. 5, 2011 (Year: 2011).*

(Continued)

*Primary Examiner* — Jason Lin
(74) *Attorney, Agent, or Firm* — Wenderoth, Lind & Ponack, L.L.P.

(57) ABSTRACT

A unit space update device, which generates a unit space, includes: a detection value acquisition unit which acquires a bundle of detection values detected at a constant cycle; and a deletion processing unit which deletes one bundle from the bundles of the detection values constituting the unit space, when adding the bundle of the detection values to the unit space. The deletion processing unit includes at least one among: a first processing unit which randomly deletes one bundle from the bundles of the detection values forming the unit space; and a second processing unit which, with respect to the detection value of the predetermined evaluation item among the plurality of evaluation items, deletes any one bundle of the bundles including the detection value with the highest appearance frequency in the unit space, or one of (Continued)

two bundles having the smallest difference between the detected values in the unit space.

4 Claims, 9 Drawing Sheets

(56) References Cited

U.S. PATENT DOCUMENTS

| | | | | |
|---|---|---|---|---|
| 7,751,741 | B2* | 7/2010 | Hirai | G01J 1/0414 |
| | | | | 399/74 |
| 7,778,555 | B2* | 8/2010 | Shoji | H04N 1/00074 |
| | | | | 399/9 |
| 7,818,267 | B1* | 10/2010 | Bilibin | G06Q 10/10 |
| | | | | 705/335 |
| 7,962,054 | B2* | 6/2011 | Nakazato | G03G 15/55 |
| | | | | 399/24 |
| 8,091,014 | B2* | 1/2012 | Mochida | G06F 11/0751 |
| | | | | 714/47.1 |
| 8,294,918 | B2* | 10/2012 | Satoh | G06K 15/002 |
| | | | | 358/1.14 |
| 8,451,468 | B2* | 5/2013 | Soda | H04N 1/32635 |
| | | | | 358/1.14 |
| 9,134,198 | B2* | 9/2015 | Djelassi | F02C 9/16 |
| 9,300,823 | B1* | 3/2016 | Adachi | H04N 1/00244 |
| 9,727,671 | B2* | 8/2017 | Iyengar | G06F 30/20 |
| 10,069,989 | B2* | 9/2018 | Koguchi | H04N 1/00891 |
| 2005/0251321 | A1* | 11/2005 | DeCarlo | G01M 15/046 |
| | | | | 701/114 |
| 2010/0198555 | A1* | 8/2010 | Takahama | F01D 19/00 |
| | | | | 702/179 |
| 2012/0041575 | A1 | 2/2012 | Maeda et al. | |
| 2015/0293531 | A1 | 10/2015 | Mikami | |
| 2019/0018402 | A1 | 1/2019 | Enomoto et al. | |

FOREIGN PATENT DOCUMENTS

| | | |
|---|---|---|
| JP | 2010-191556 | 9/2010 |
| JP | 2012-252556 | 12/2012 |
| JP | 2013-191136 | 9/2013 |
| JP | 2015-203932 | 11/2015 |
| JP | 2016-006594 | 1/2016 |
| JP | 2018-055394 | 4/2018 |
| JP | 2018-092679 | 6/2018 |
| KR | 10-2015-0056612 | 5/2015 |
| WO | 2017/115814 | 7/2017 |

OTHER PUBLICATIONS

International Search Report dated Jan. 14, 2020 in International (PCT) Application No. PCT/JP2019/043316 with English translation.
Written Opinion of the International Searching Authority dated Jan. 14, 2020 in International (PCT) Application No. PCT/JP2019/043316 with English translation.

* cited by examiner

FIG.7

| IDENTIFICATION NUMBER | ... | A1 | A5 | A6 | ... | A20 | A22 | A30 | A31 | A35 | ... |
|---|---|---|---|---|---|---|---|---|---|---|---|
| OUTPUT (MW) | ... | 100.000 | 100.500 | 100.800 | ... | 200.000 | 200.020 | 200.030 | 200.035 | 200.050 | ... |

⎵ 0.5  ⎵ 0.3     ⎵ 0.02  ⎵ 0.01  ⎵ 0.005  ⎵ 0.015

UNIT SPACE UPDATE DEVICE, UNIT SPACE UPDATE METHOD, AND PROGRAM

TECHNICAL FIELD

The present invention relates to a unit space update device, a unit space update method, and a program.

Priority is claimed on Japanese Patent Application No. 2018-207490 filed on Nov. 2, 2018, the content of which is incorporated herein by reference.

BACKGROUND ART

In various types of plants, such as a gas turbine power generation plant, a nuclear power generation plant, and a chemical plant, a bundle of detected values (state quantities) of each of a plurality of evaluation items (temperature and pressure) is acquired, and whether or not the plant is normally operating is monitored based on the tendencies of the detected values. For example, a technique of monitoring a plant operation state with the use of the Mahalanobis-Taguchi method (hereinafter, referred to as the "MT method") is described in PTL 1. The MT method is a technique of calculating the Mahalanobis distance of bundles of detected values acquired from a plant with a unit space configured by a plurality of bundles of detected values accumulated in the past as reference and determining whether a plant operation state is normal or abnormal depending on whether or not the Mahalanobis distance is within a threshold value determined in advance.

In addition, updating the unit space with the elapse of time is considered so as to be able to respond to change in tendencies of detected values caused by the aging deterioration of the plant and seasonal changes. For example, PTL 1 describes a technique of adding a newly acquired bundle of detected values to the unit space and deleting the oldest bundle of detected values from the unit space to update the unit space for each predetermined cycle.

CITATION LIST

Patent Literature

[PTL 1] Japanese Unexamined Patent Application Publication No. 2012-252556

SUMMARY OF INVENTION

Technical Problem

For example, after plant startup, the plant operates continuously for a long period of time in some cases in a state where a certain load is maintained. At this time, in the invention described in PTL 1, there is a possibility that a bundle of detected values acquired in an operation state with low frequency of occurrence, such as the time of plant startup and the time of load fluctuations, is deleted from the unit space with the elapse of time. Then, in a case where a plant operation state is monitored with the unit space as reference, there is a possibility of mistakenly determining that the operation state is abnormal, when plant startup is performed next, or when the load of the plant fluctuates.

The present invention is devised in view of such problems, and provides a unit space update device, a unit space update method, and a program, with which a unit space from which a plant operation state can be accurately determined can be created.

Solution to Problem

In order to solve the problems, the present invention adopts the following means.

According to a first aspect of the present invention, there is provided a unit space update device that updates a unit space, which is configured by a plurality of bundles of detected values for each of a plurality of evaluation items and serves as reference when calculating a Mahalanobis distance. The unit space update device includes a detected value acquiring unit that acquires the bundle of detected values detected in a constant cycle and a deletion processing unit that deletes one bundle from the plurality of bundles of detected values configuring the unit space when adding the bundle of detected values to the unit space. The deletion processing unit has at least one of a first processing unit that randomly deletes one bundle from the plurality of bundles of detected values configuring the unit space and a second processing unit that deletes, for detected values of an evaluation item determined in advance among the plurality of evaluation items, any one bundle, among bundles including detected values with highest frequency of appearance in the unit space or one bundle of two bundles between which a difference in detected value is smallest in the unit space.

By doing so, the unit space update device can reduce a probability that a bundle of detected values with a low value of the frequency of appearance, that is, a bundle of detected values indicating an operation state with low frequency of appearance is deleted from the unit space when updating the unit space by adding a new bundle of detected values. As a result, since bundles of detected values in different operation states are likely to be included in the unit space, the unit space from which a plant operation state can be accurately determined can be created.

According to a second aspect of the present invention, in the unit space update device according to the first aspect, the deletion processing unit has both of the first processing unit and the second processing unit, and the deletion processing unit selects any one of the first processing unit and the second processing unit to cause the selected one to perform deletion processing when adding the bundle of detected values to the unit space.

By doing so, the unit space update device can cause the first processing unit to suppress the occurrence of a bias in a bundle of detected values remaining in the unit space while reducing a probability that the second processing unit deletes a bundle of detected values with low frequency of appearance from the unit space. As a result, the unit space from which a plant operation state can be accurately determined can be created.

According to a third aspect of the present invention, in the unit space update device according to the second aspect, the deletion processing unit selects any one of the first processing unit and the second processing unit such that a proportion in which the first processing unit is selected and a proportion in which the second processing unit is selected are in a predetermined ratio.

By doing so, as a ratio is set depending on the characteristics of the plant, the unit space update device can create the unit space from which a plant operation state can be more accurately determined.

According to a fourth aspect of the present invention, there is provided a unit space update method of generating a unit space, which is configured by a plurality of bundles of detected values for each of a plurality of evaluation items and serves as reference when calculating a Mahalanobis distance. The unit space update method has a detected value acquiring step of acquiring the bundle of detected values detected in a constant cycle and a deletion processing step of deleting one bundle from the plurality of bundles of detected values configuring the unit space when adding the bundle of detected values to the unit space. The deletion processing step has at least one of a first processing step of randomly deleting one bundle from the plurality of bundles of detected values configuring the unit space and a second processing step of deleting, for detected values of an evaluation item determined in advance among the plurality of evaluation items, any one bundle, among bundles including detected values with highest frequency of appearance in the unit space or one bundle of two bundles between which a difference in detected value is smallest in the unit space.

According to a fifth aspect of the present invention, there is provided a program that causes a computer of a unit space update device generating a unit space, which is configured by a plurality of bundles of detected values for each of a plurality of evaluation items and serves as reference when calculating a Mahalanobis distance, to function. The program causes the computer to execute a detected value acquiring step of acquiring the bundle of detected values detected in a constant cycle and a deletion processing step of deleting one bundle from the plurality of bundles of detected values configuring the unit space when adding the bundle of detected values to the unit space. The deletion processing step has at least one of a first processing step of randomly deleting one bundle from the plurality of bundles of detected values configuring the unit space and a second processing step of deleting, for detected values of an evaluation item determined in advance among the plurality of evaluation items, any one bundle, among bundles including detected values with highest frequency of appearance in the unit space or one bundle of two bundles between which a difference in detected value is smallest in the unit space.

Advantageous Effects of Invention

With the unit space update device, the unit space update method, and the program according to the present invention, the unit space from which a plant operation state can be accurately determined can be created.

BRIEF DESCRIPTION OF DRAWINGS

FIG. 7 is a second diagram for describing the function of the deletion processing unit according to the embodiment of the present invention.

DESCRIPTION OF EMBODIMENTS

Hereinafter, a unit space update device 20 according to an embodiment of the present invention will be described with reference to FIGS. 1 to 9.

(Overall Configuration)

Figure 1:
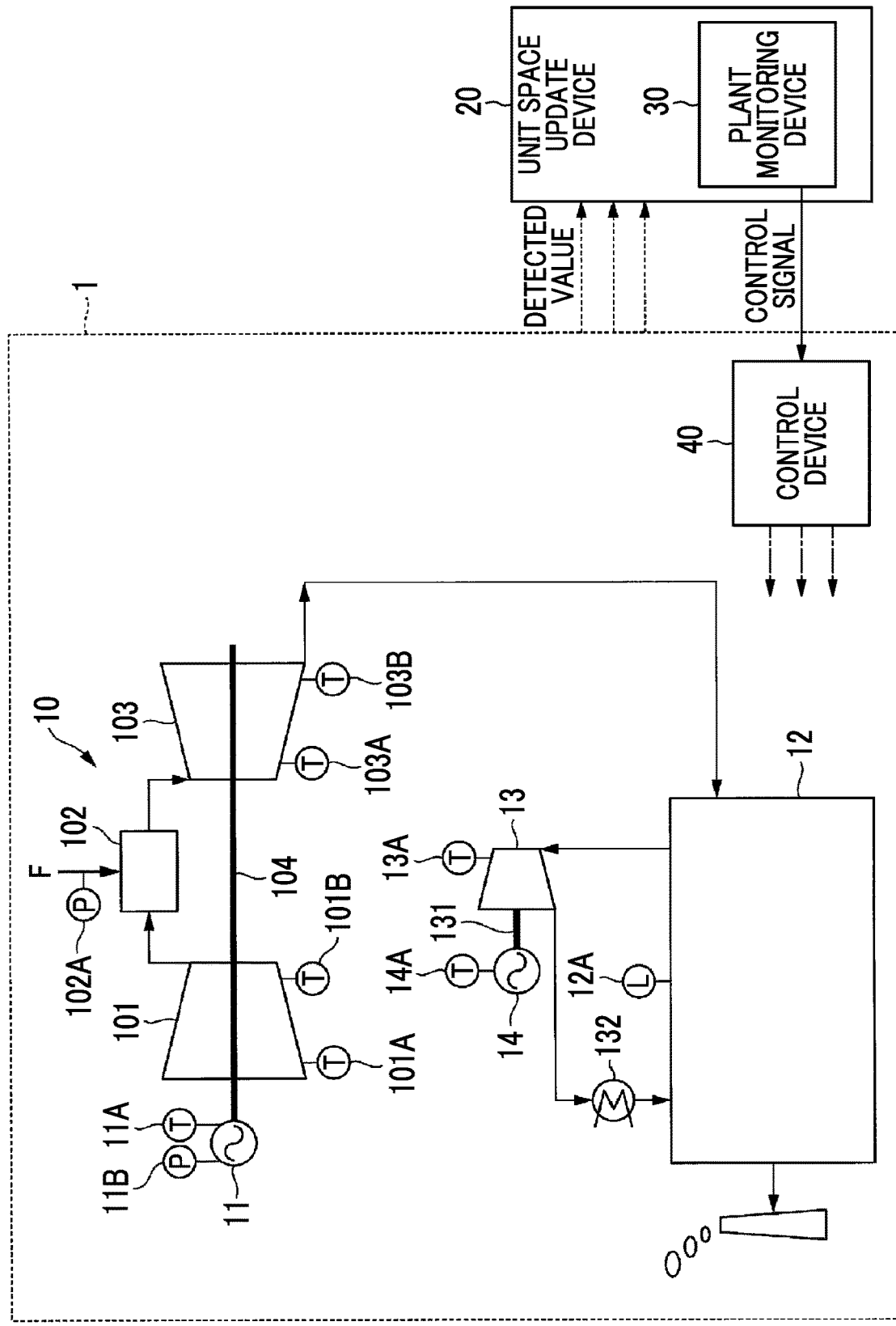
FIG. 1 is a diagram for describing an outline of a unit space update device according to an embodiment of the present invention.

As shown in FIG. 1, the unit space update device 20 according to the present embodiment is a device for creating and updating a unit space that is configured by a plurality of bundles of detected values for each of a plurality of evaluation items, and serves as reference when calculating the Mahalanobis distance with the use of the Mahalanobis-Taguchi method (hereinafter, referred to as the MT method). The unit space update device 20 acquires a detected value indicating a state quantity for each evaluation item from a detector provided in each part of a plant 1 and updates the unit space. In addition, the unit space update device 20 may have a plant monitoring device 30 that determines whether an operation state of the plant 1 is normal or abnormal based on the acquired detected value, with the use of the MT method.

The plant 1 according to the present embodiment is a gas turbine combined power generation plant, and includes a gas turbine 10, a gas turbine generator 11, a heat recovery steam generator 12, a steam turbine 13, a steam turbine generator 14, and a control device 40. In another embodiment, the plant 1 may be a gas turbine power generation plant, a nuclear power generation plant, or a chemical plant.

The gas turbine 10 includes a compressor 101, a combustor 102, and a turbine 103.

The compressor 101 compresses air taken in from a suction port. The compressor 101 is provided with temperature sensors 101A and 101B as detectors for detecting a temperature in a vehicle interior of the compressor 101, which is one of the evaluation items. For example, the temperature sensor 101A may detect the temperature of a vehicle interior inlet of the compressor 101 (inlet air temperature), and the temperature sensor 101B may detect the temperature of a vehicle interior outlet (outlet air temperature).

The combustor 102 mixes a fuel F with compressed air introduced from the compressor 101 to combust the mixture, and generates a combustion gas. The combustor 102 is provided with a pressure sensor 102A as a detector for detecting the pressure of the fuel F, which is one of the evaluation items.

The turbine 103 is rotationally driven by the combustion gas supplied from the combustor 102. The turbine 103 is provided with temperature sensors 103A and 103B as detectors for detecting a temperature in the vehicle interior, which is one of the evaluation items. For example, the temperature sensor 103A may detect the temperature of a vehicle interior inlet of the turbine 103 (inlet combustion gas temperature), and the temperature sensor 103B may detect the temperature of a vehicle interior outlet (outlet combustion gas temperature).

The gas turbine generator 11 is connected to a rotor 104 of the turbine 103 via the compressor 101, and generates power through the rotation of the rotor 104. The gas turbine generator 11 is provided with a temperature sensor 11A as a detector for detecting the temperature of a lubricant, which is one of the evaluation items. In addition, the gas turbine generator 11 is provided with a watt meter 11B as a detector for detecting the output of the gas turbine generator 11, which is one of the evaluation items.

The heat recovery steam generator 12 heats water with a combustion gas (exhaust gas) exhausted from the turbine 103, and generates steam. The heat recovery steam generator 12 is provided with a level meter 12A as a detector for detecting a drum level, which is one of the evaluation items.

The steam turbine 13 is driven by steam from the heat recovery steam generator 12. The steam turbine 13 is provided with a temperature sensor 13A as a detector for detecting a temperature in the vehicle interior, which is one of the evaluation items. In addition, the steam exhausted from the steam turbine 13 is converted back to water by a condenser 132, and is sent to the heat recovery steam generator 12 via a water supply pump.

The steam turbine generator 14 is connected to a rotor 131 of the steam turbine 13, and generates power through the rotation of the rotor 131. The steam turbine generator 14 is provided with a temperature sensor 14A as a detector for detecting the temperature of a lubricant, which is one of the evaluation items.

The evaluation items described above are examples, and are not limited thereto. For example, a pressure in the vehicle interior of the turbine 103 and the rotation speed and vibration of the rotor 104 may be set as other evaluation items of the plant 1. In this case, although not shown, a detector that detects each of the state quantities of the evaluation items is provided in each part of the plant 1.

The control device 40 is a device for controlling an operation of the plant 1. In addition, in a case where the plant monitoring device 30 determines that the operation state of the plant 1 is abnormal, the control device 40 may control an operation of each part of the plant 1 in accordance with a control signal from the plant monitoring device 30.

(Functional Configuration of Unit Space Update Device)

Figure 2:
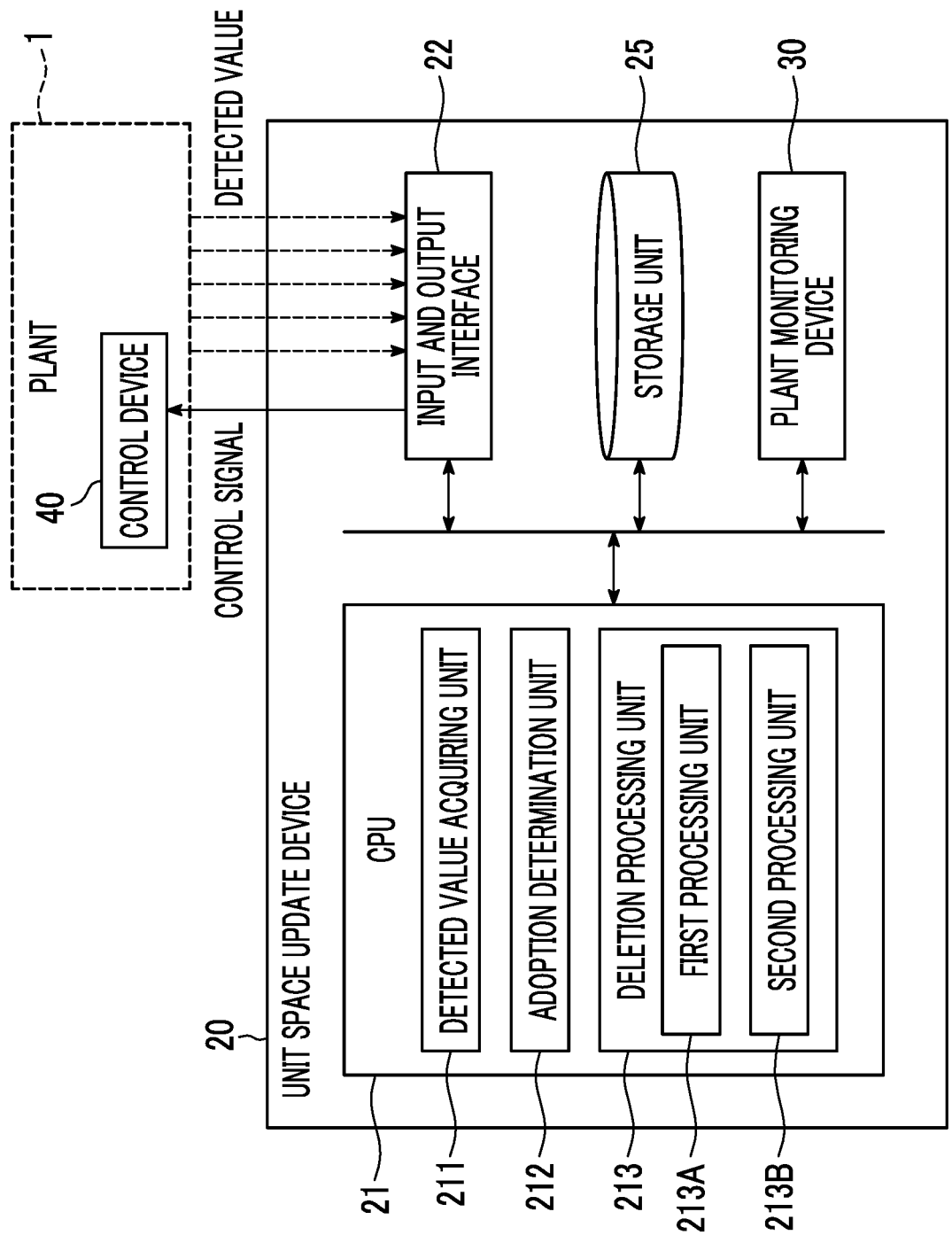
FIG. 2 is a diagram showing a functional configuration of the unit space update device according to the embodiment of the present invention.

FIG. 2 is a diagram showing a functional configuration of the unit space update device according to the embodiment of the present invention.

As shown in FIG. 2, the unit space update device 20 includes a CPU 21, an input and output interface 22, a storage unit 25, and the plant monitoring device 30.

The input and output interface 22 is connected to the detector of each part of the plant 1, and receives an input of a detected value for each of the plurality of evaluation items.

The CPU 21 is a processor that controls an operation of the entire unit space update device 20. The CPU 21 functions as a detected value acquiring unit 211, an adoption determination unit 212, and a deletion processing unit 213 by executing various types of arithmetic processing in accordance with a program prepared in advance.

The detected value acquiring unit 211 acquires a bundle of detected values, which is a collection of detected values detected in a constant cycle for each of the plurality of evaluation items, from the plant 1 via the input and output interface 22. The detected value acquiring unit 211 acquires a bundle of detected values detected every predetermined time (for example, one minute), and stores and accumulates the bundle in the storage unit 25.

The adoption determination unit 212 determines whether or not to add the bundle of detected values acquired by the detected value acquiring unit 211 as data configuring a unit space.

When adding the bundle of detected values to the unit space, the deletion processing unit 213 deletes one bundle from a plurality of bundles of detected values configuring the unit space. In addition, the deletion processing unit 213 has at least one of a first processing unit 213A and a second processing unit 213B.

The first processing unit 213A randomly deletes one bundle from the plurality of bundles of detected values configuring the unit space.

For detected values of an evaluation item determined in advance among the plurality of evaluation items, the second processing unit 213B deletes any one bundle among bundles including detected values with the highest frequency of appearance in the unit space or one bundle of two bundles between which a difference in detected value is smallest in the unit space.

The storage unit 25 stores various types of data acquired and created through the processing of each part of the CPU 21. For example, in the present embodiment, the storage unit 25 stores a unit space created and updated through the processing of each part of the CPU 21.

The plant monitoring device 30 calculates the Mahalanobis distance of the bundle of detected values acquired by the detected value acquiring unit 211 with the unit space stored in the storage unit 25 as reference. Then, the plant monitoring device 30 determines whether the operation state of the plant 1 is normal or abnormal depending on whether or not the calculated Mahalanobis distance exceeds a threshold value determined in advance. In addition, in a case where an operator who performs plant monitoring has performed operation for remotely controlling the plant 1 via the plant monitoring device 30, the plant monitoring device 30 may output a control signal corresponding to the operation to the control device 40 of the plant 1.

(Processing Flow of Unit Space Update Device)

Figure 3:
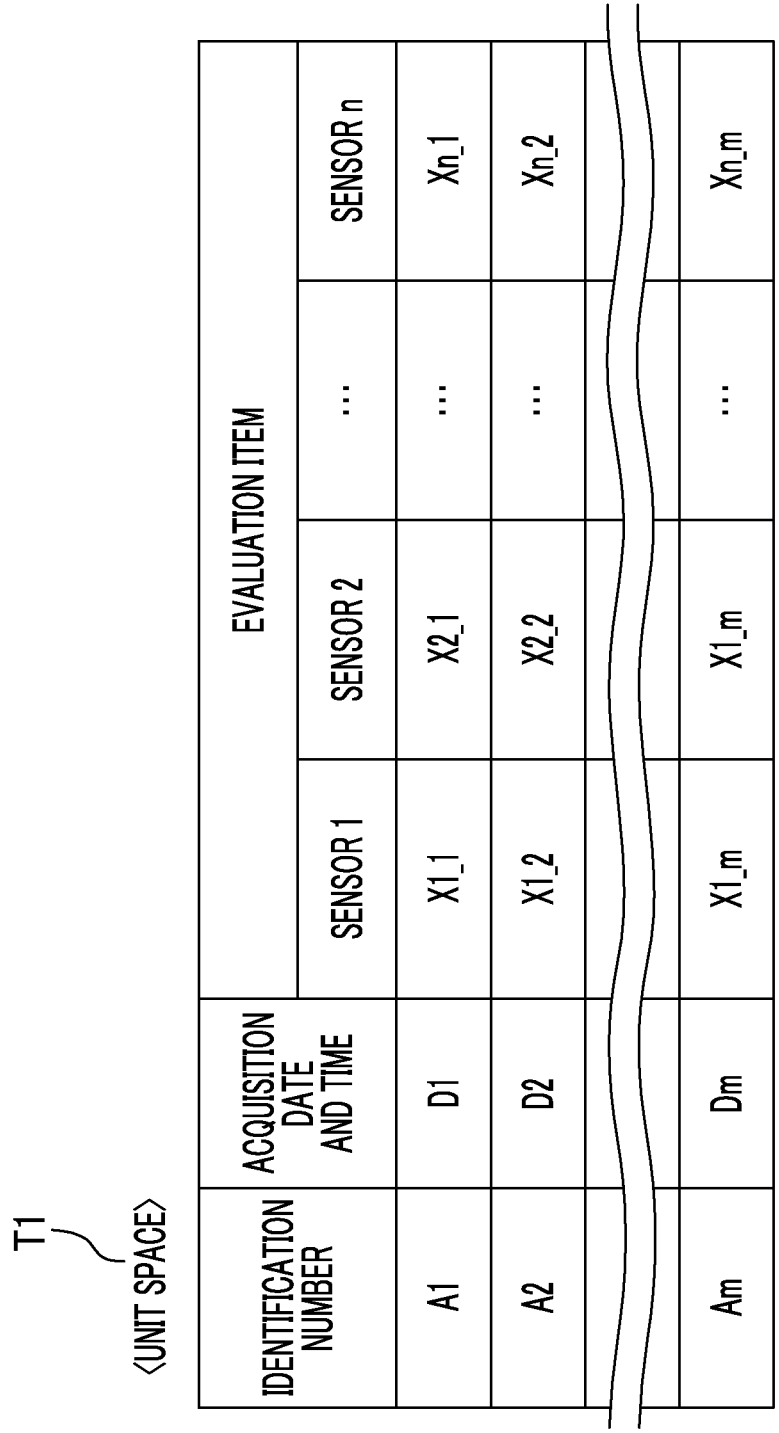
FIG. 3 is a table showing an example of a unit space according to the embodiment of the present invention.

FIG. 3 is a table showing an example of the unit space according to the embodiment of the present invention.

Figure 4:
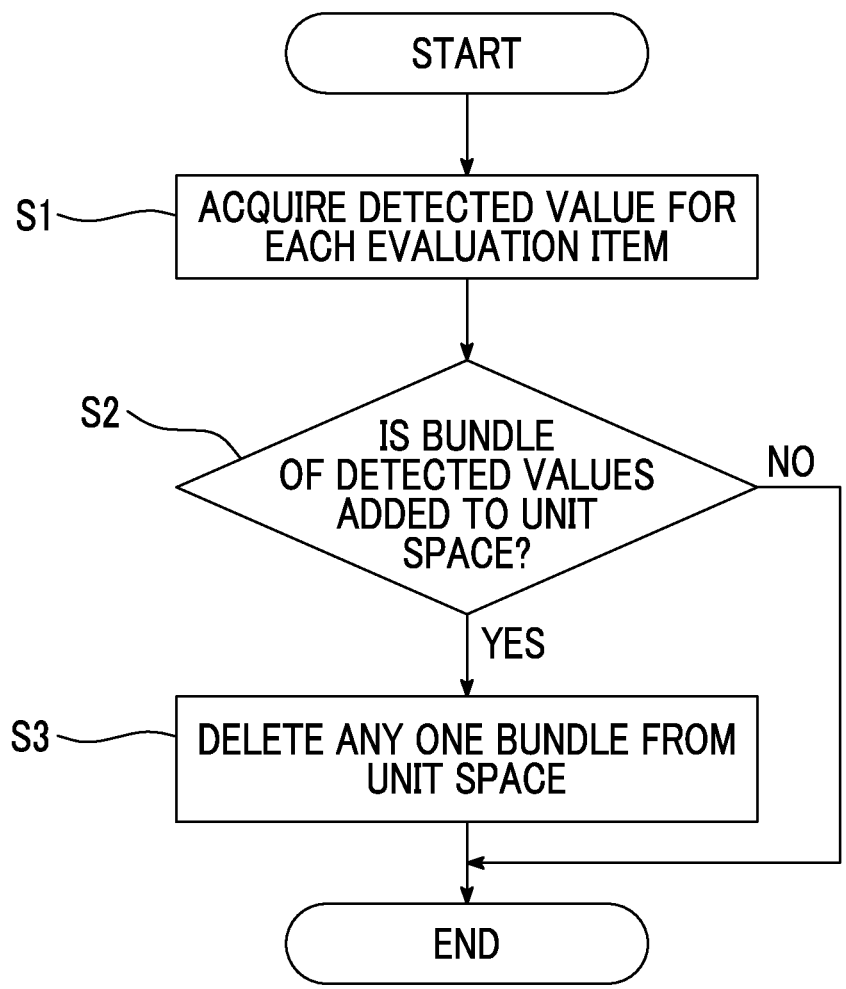
FIG. 4 is a first flowchart showing an example of processing of the unit space update device according to the embodiment of the present invention.

FIG. 4 is a first flowchart showing an example of the processing of the unit space update device according to the embodiment of the present invention.

Figure 5:
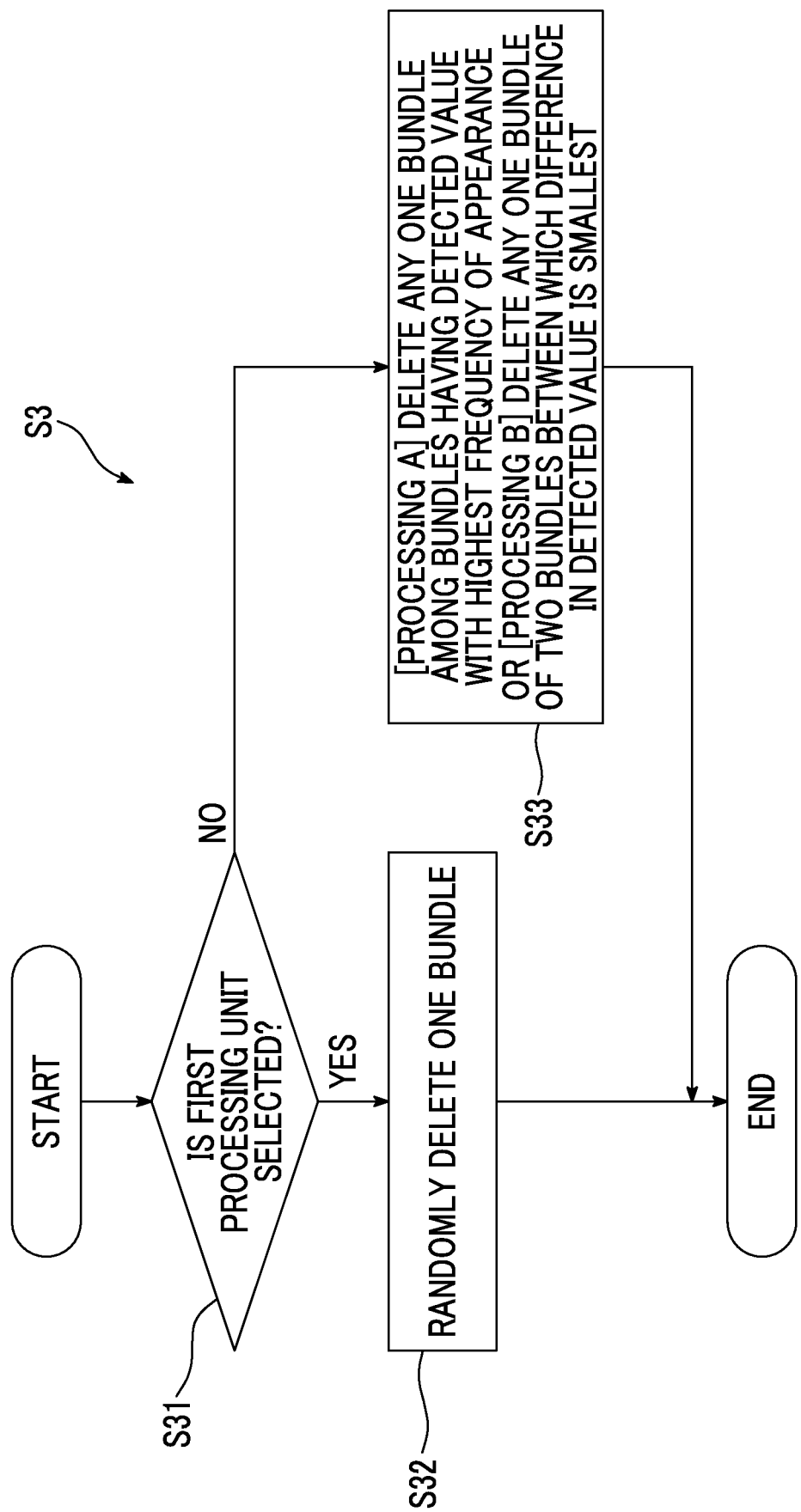
FIG. 5 is a second flowchart showing an example of the processing of the unit space update device according to the embodiment of the present invention.

FIG. 5 is a second flowchart showing an example of the processing of the unit space update device according to the embodiment of the present invention.

Hereinafter, an example of the processing of the unit space update device 20 according to the present embodiment will be described with reference to FIGS. 3 to 5.

Herein, an already created unit space T1 is stored in the storage unit 25 of the unit space update device 20 (FIG. 3). As shown in FIG. 3, the unit space T1 is configured by m bundles A1 to Am extracted from the plurality of bundles of detected values accumulated in the storage unit 25. The bundles A1 to Am of detected values each include detected values X1 to Xn of n evaluation items. A total number m of bundles of detected values configuring the unit space T1 is set to be approximately three times the number n of evaluation items in the present embodiment. For example, in a case where the number n of evaluation items is 150, the total number m of bundles of detected values configuring the unit space T1 is 450. In addition, an identification number (A1 to Am) and acquisition date and time (D1 to Dm) acquired by the detected value acquiring unit 211 may be assigned to each of the bundles A1 to Am of detected values.

Next, processing of updating the unit space T1 by the unit space update device 20 will be described with reference to FIG. 4.

As shown in FIG. 4, first, the detected value acquiring unit 211 of the unit space update device 20 acquires a detected value for each evaluation item from a detector provided in each part of the plant 1 (Step S1). For example, in a case where the number of evaluation items is 150, the detected value acquiring unit 211 acquires 150 detected values corresponding to each of the evaluation items, and stores the evaluation items in the storage unit 25 as one bundle (bundle of detected values).

Next, the adoption determination unit 212 determines whether or not to add the bundle of detected values acquired in Step S1 as a new bundle configuring the unit space T1 (Step S2).

Specifically, the adoption determination unit 212 acquires the bundle of detected values acquired in Step S1 when the operation state of the plant 1 is normal, and determines to add the bundle of detected values to the unit space T1 in a case of unit space update timing (Step S2: YES). For example, the adoption determination unit 212 calculates the Mahalanobis distance of the bundle of detected values, and determines whether or not the operation state of the plant 1 is normal at a time point when the bundle of detected values is acquired. In addition, the adoption determination unit 212 determines that it is unit space update timing in a case where a predetermined period (for example, four hours) has elapsed from a time point of the previous update of the unit space T1. The adoption determination unit 212 may randomly set timing when the unit space is updated from a period from the time point of the previous update of the unit space T1 to the elapse of the predetermined period.

In addition, in a case where the bundle of detected values acquired in Step S1 is not a bundle acquired when the operation state of the plant 1 is normal, or in a case where it is not determined to be unit space update timing, the adoption determination unit 212 determines not to add the bundle of detected values to the unit space T1 (Step S2: NO), and terminates the processing.

Next, in a case where the adoption determination unit 212 determines to add the bundle of detected values to the unit space T1 (Step S2: YES), the deletion processing unit 213 deletes any one bundle from the plurality of bundles A1 to Am of detected values configuring the unit space T1 (Step S3). Specifically, in Step S3, the deletion processing unit 213 according to the present embodiment executes a series of types of processing shown in FIG. 5.

As shown in FIG. 5, the deletion processing unit 213 selects any one of the first processing unit 213A and the second processing unit 213B as a processing unit that executes processing of deleting any one bundle (Step S31).

Specifically, the deletion processing unit 213 generates a random number between "0" and "1". Then, the deletion processing unit 213 selects the first processing unit 213A when the random number is equal to or smaller than a reference value set in advance, and selects the second processing unit 213B when the random number is larger than the reference value. The reference value is set such that a proportion in which the first processing unit 213A is selected and a proportion in which the second processing unit 213B is selected are in a predetermined ratio. For example, in a case where a proportion in which the first processing unit 213A is selected is "30%" and a proportion in which the second processing unit 213B is selected is "70%", the reference value is set to "0.3". In addition, the random number herein may not be a uniform random number, such as the value of a uniform random number to the nth power.

In a case where the deletion processing unit 213 selects the first processing unit 213A with the use of the random number (Step S31: YES), the first processing unit 213A randomly deletes any one bundle among the plurality of bundles A1 to Am of detected values configuring the unit space T1 (Step S32). Since a bundle to be deleted is randomly selected while excluding intention as described above, the first processing unit 213A can suppress the occurrence of a bias in bundles of detected values remaining in the unit space T1.

On the contrary, in a case where the deletion processing unit 213 selects the second processing unit 213B with the use of the random number (Step S31: NO), the second processing unit 213B deletes any one bundle with reference to a detected value of an evaluation item determined in advance among a plurality of evaluation items 1 to n (Step S33). For example, the second processing unit 213B according to the present embodiment executes any one type of processing of "processing A" and "processing B" to be described below with reference to an evaluation item indicating an output of the gas turbine generator 11, among the plurality of evaluation items 1 to n. Which one of "the processing A" and "the processing B" is to be selected by the second processing unit 213B may be random, or the processing A and the processing B may be alternately executed.

"Processing A"

Figure 6:
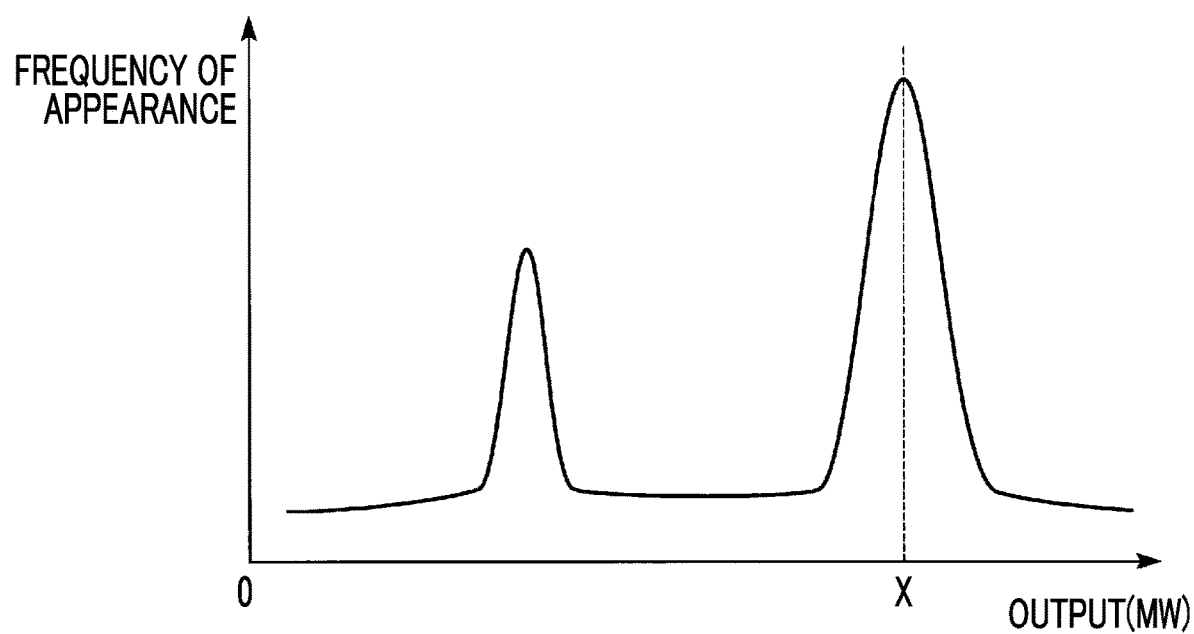
FIG. 6 is a first diagram for describing a function of a deletion processing unit according to the embodiment of the present invention.

FIG. 6 is a first diagram for describing a function of the deletion processing unit according to the embodiment of the present invention.

As shown in FIG. 6, the second processing unit 213B extracts a detected value indicating an output (MW) of the gas turbine generator 11 from each of the plurality of bundles A1 to Am of detected values configuring the unit space T1, divides the detected values into a section for each predetermined value (for example, 1 MW), and calculates the frequency of appearance for each section. In an example of FIG. 6, since the detected value included in a section X has the highest frequency of appearance, the second processing unit 213B deletes any one bundle among bundles having the detected value included in the section X (the processing A of Step S33). At this time, the second processing unit 213B may randomly delete any one bundle among the bundles having the detected value included in the section X. In addition, the second processing unit 213B may sort the detected values included in the section X in the order of values, and delete any one bundle (for example, having older acquisition date and time) of two bundles in which a difference between two detected values adjacent to each other is smallest. By performing such processing A, the second processing unit 213B can remove a detected value with higher frequency of appearance from the unit space T1, and can suppress the loss of a detected value having lower frequency of appearance.

"Processing B"

FIG. 7 is a second diagram for describing the function of the deletion processing unit according to the embodiment of the present invention.

In addition, as shown in FIG. 7, the second processing unit 213B extracts a detected value indicating an output (MW) of the gas turbine generator 11 from each of the plurality of bundles A1 to Am of detected values configuring the unit space T1, and sorts the detected values in the order of values. Then, the second processing unit 213B deletes any one bundle of two bundles in which a difference between two detected values adjacent to each other is smallest (the processing B of Step S33). In an example of FIG. 7, a difference (0.005) between detected values of the respective bundles A30 and A31 of detected values is smallest. For this reason, the second processing unit 213B deletes any one of the bundles A30 and A31 of detected values. At this time, the second processing unit 213B may randomly delete any one of the bundles A30 and A31 of detected values, or may delete one with older acquisition date and time.

The unit space update device 20 executes the processing of FIGS. 4 and 5 to update the unit space T1 each time the detected value acquiring unit 211 acquires a bundle of detected values from the plant 1.

Figure 8:
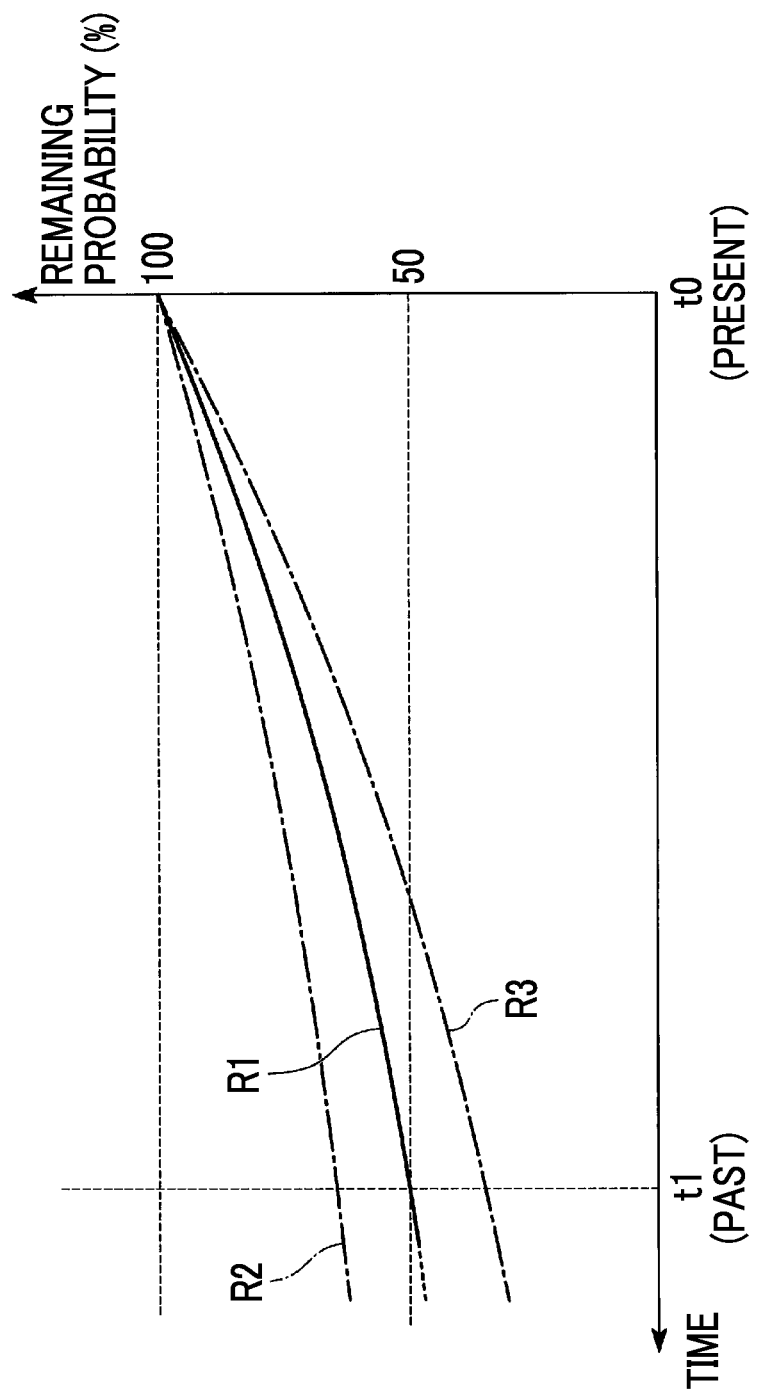
FIG. 8 is a third diagram for describing the function of the deletion processing unit according to the embodiment of the present invention.

FIG. 8 is a third diagram for describing the function of the deletion processing unit according to the embodiment of the present invention.

The horizontal axis in FIG. 8 represents time when the bundles A1 to Am of detected values are added to the unit space T1, and the vertical axis represents a remaining probability of the bundles A1 to Am of detected values remaining without being deleted when updating the unit space T1. As shown in FIG. 8, a remaining probability of bundles of detected values added at time t0 (the present) when the unit space T1 is updated is 100%, and a remaining probability of bundles of detected values added in the past gradually declines.

R1 of FIG. 8 represents a remaining probability of bundles of detected values in a case where setting is performed such that a proportion in which the first processing unit 213A is selected is "30%" and a proportion in which the second processing unit 213B is selected is "70%". In this case, in a case where a total number of bundles of detected values configuring a unit space is m (for example, 450), a remaining probability of bundles of detected values added when updating the unit space m times before (time t1 of FIG. 8) is approximately 50%.

On the other hand, in the related art, older bundles of detected values are deleted in turn. In this case, although not shown, a remaining probability of bundles of detected values added at the time t1 is 0%. Then, in a case where plant startup and load fluctuations occur at the time t1, a bundle of detected values indicating such an operation state is lost from the unit space. Thus, there is a possibility that a plant operation state is mistakenly determined to be abnormal when the next plant startup and load fluctuations occur.

However, as the deletion processing unit 213 performs the processing described above, the unit space update device according to the present embodiment can increase a probability that a bundle of detected values indicating such an operation state remains in the unit space T1, for example, even when the startup of the plant 1 and load fluctuations occur at the time t1. By using such a unit space T1, it is possible to prevent the plant monitoring device 30 from mistakenly determining that the plant operation state is abnormal in response to hypersensitivity to the startup of the plant 1 and load fluctuations.

In addition, R2 of FIG. 8 represents a remaining probability of bundles of detected values in a case where a proportion in which the first processing unit 213A is selected is larger than "30%". In this case, a remaining probability of bundles of detected values added at the time t1 is larger than the case of R1 as a whole. In a case where an operator who monitors the plant 1 wants to increase the past remaining probability of detected values depending on characteristics of the plant 1, a proportion in which the first processing unit 213A is selected may be adjusted to be increased as described above.

Further, R3 of FIG. 8 represents a remaining probability of bundles of detected values in a case where a proportion in which the first processing unit 213A is selected is smaller than "30%". In this case, a remaining probability of bundles of detected values added at the time t1 is smaller than the case of R1 as a whole. In a case where the operator who monitors the plant 1 wants to decrease the past remaining probability of detected values depending on characteristics of the plant 1, a proportion in which the first processing unit 213A is selected may be adjusted to be decreased as described above.

(Hardware Configuration of Unit Space Update Device)

Figure 9:
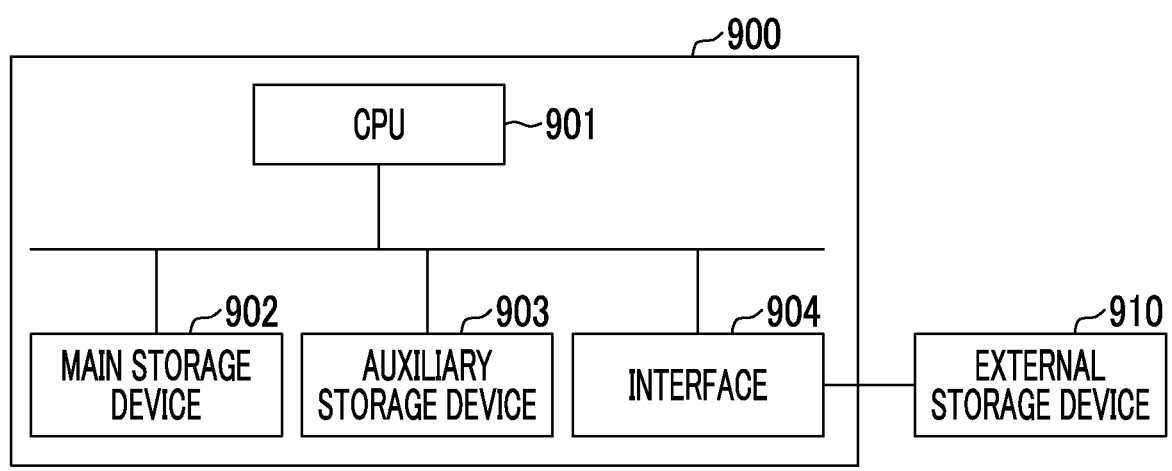
FIG. 9 is a diagram showing an example of a hardware configuration of the unit space update device according to the embodiment of the present invention.

FIG. 9 is a diagram showing an example of a hardware configuration of the unit space update device according to the embodiment of the present invention.

Hereinafter, the hardware configuration of the unit space update device 20 according to the present embodiment will be described with reference to FIG. 9.

A computer 900 includes a CPU 901, a main storage device 902, an auxiliary storage device 903, and an interface 904.

The unit space update device 20 described above is mounted on the computer 900. Then, an operation of each part of the unit space update device 20 described above is stored in a form of a program in the auxiliary storage device 903 included in each computer 900. The CPU 901 (CPU 21) reads the program from the auxiliary storage device 903, deploys the program in the main storage device 902, and executes the processing in accordance with the program. In addition, the CPU 901 secures, in the main storage device 902, a storage area (storage unit 25) for storing various types of information which is acquired and generated with the processing in accordance with the program. In addition, the CPU 901 secures the storage area for storing data, which is being processed, in the auxiliary storage device 903 in accordance with the program.

The computer 900 is connected to an external storage device 910 via the interface 904, and the storage area may be secured in the external storage device 910.

In at least one embodiment, the auxiliary storage device 903 is an example of a non-transitory tangible medium. Other examples of the non-transitory tangible medium include a magnetic disk, a magneto-optical disk, a CD-ROM, a DVD-ROM, and a semiconductor memory which are connected via the interface 904. In addition, in a case where the program is distributed to the computer 900 via a communication line, the computer 900 that has received the distribution may deploy the program in the main storage device 902 and execute the processing.

In addition, the program may be a program for realizing some of the functions described above. Further, the program may be a program that realizes the functions described above in combination with other programs already stored in the auxiliary storage device 903, that is, a so-called difference file (difference program).

(Operational Effects)

As described above, the unit space update device 20 according to the present embodiment is a unit space update device that generates the unit space T1, which is configured by the plurality of bundles A1 to Am of detected values for each of the plurality of evaluation items and serves as reference when calculating the Mahalanobis distance, and includes the detected value acquiring unit 211, which acquires a bundle of detected values detected in a constant cycle, and the deletion processing unit 213, which deletes one bundle from the plurality of bundles A1 to Am of detected values configuring the unit space T1 when adding a bundle of detected values to the unit space T1. The deletion processing unit 213 has the first processing unit 213A that randomly deletes one bundle from the plurality of bundles A1 to Am of detected values configuring the unit space T1 and the second processing unit 213B that deletes, for detected values of an evaluation item determined in advance among the plurality of evaluation items, any one bundle among bundles including detected values with the highest frequency of appearance in the unit space or one bundle of two bundles between which a difference in detected value is smallest in the unit space T1.

In the related art, when adding a new bundle of detected values to the unit space, the oldest bundle of detected values is deleted from the unit space. For this reason, in a case where the oldest bundle of detected values is a bundle indicating an operation state with low frequency of appearance, for example, the time of plant startup, a bundle of detected values corresponding to the time of plant startup is lost from the unit space. Then, when the next plant startup is performed, there is a possibility of being a unit space in which the operation state is likely to be mistakenly determined to be abnormal.

However, as the unit space update device 20 according to the present embodiment has the configuration described above, a probability that a bundle of detected values with a low value of the frequency of appearance, that is, a bundle of detected values indicating an operation state with low frequency of appearance is deleted from the unit space T1 when updating the unit space T1 by adding a new bundle of detected values can be reduced. As a result, since bundles of detected values in different operation states are likely to be included in the unit space T1, the unit space T1 from which the operation state of the plant 1 can be accurately determined can be created.

In addition, when adding a bundle of detected values to the unit space T1, the deletion processing unit 213 selects any one of the first processing unit 213A and the second processing unit 213B to cause the selected one to perform deletion processing.

By doing so, the unit space update device 20 can cause the first processing unit 213A to suppress the occurrence of a bias in a bundle of detected values remaining in the unit space T1 while reducing a probability that the second processing unit 213B deletes a bundle of detected values with low frequency of appearance from the unit space T1. As a result, the unit space T1 from which the operation state of the plant 1 can be accurately determined can be created.

In addition, the deletion processing unit 213 selects any one of the first processing unit and the second processing unit such that a proportion in which the first processing unit 213A is selected and a proportion in which the second processing unit 213B is selected are in a predetermined ratio.

By doing so, as a ratio is set depending on the characteristics of the plant 1, the unit space update device 20 can create the unit space T1 from which the operation state of the plant 1 can be more accurately determined.

Although the embodiment of the present invention has been described in detail hereinbefore, the present invention is not limited thereto and can somewhat undergo design changes as well without departing from the technical spirit of the present invention.

For example, although an aspect in which the deletion processing unit 213 has both of the first processing unit 213A and the second processing unit 213B has been described in the embodiment described above, the invention is not limited thereto. In another embodiment, the deletion processing unit 213 may have only the first processing unit 213A or the second processing unit 213B.

In a case where the deletion processing unit 213 has only the first processing unit 213A, the deletion processing unit 213 and the first processing unit 213A execute only Step S32 of FIG. 5. Even with such a configuration, the unit space update device 20 can increase a probability that a bundle of detected values in an operation state with low frequency of appearance remains in the unit space T1 as shown by R2 of FIG. 8, rather than an older bundle of detected values is deleted in turn as in the related art.

In addition, in a case where the deletion processing unit 213 has only the second processing unit 213B, the deletion processing unit 213 and the second processing unit 213B execute only Step S33 of FIG. 5. Even with such a configuration, the unit space update device 20 can increase a probability that a bundle of detected values in an operation state with low frequency of appearance remains in the unit space T1 as shown by R3 of FIG. 8, rather than an older bundle of detected values is deleted in turn as in the related art.

INDUSTRIAL APPLICABILITY

With the unit space update device, the unit space update method, and the program according to the present invention, the unit space from which a plant operation state can be accurately determined can be created.

REFERENCE SIGNS LIST 1 plant
10 gas turbine
11 gas turbine generator
12 heat recovery steam generator
13 steam turbine
14 steam turbine generator
20 unit space update device
21 CPU
211 detected value acquiring unit
212 adoption determination unit
213 deletion processing unit
213A first processing unit
213B second processing unit
22 input and output interface
25 storage unit
30 plant monitoring device
40 control device

The invention claimed is:

1. A unit space update device that updates a unit space, which is configured by a plurality of bundles of detected values for each of a plurality of evaluation items and serves as reference when calculating a Mahalanobis distance, the unit space update device comprising:
 a detected value acquiring unit that acquires a bundle of detected values detected in a constant cycle; and
 a deletion processing unit that deletes one bundle from the plurality of bundles of detected values configuring the unit space so that, when adding the bundle of detected values to the unit space as a new bundle, the deleted one bundle is replaced with the new bundle,
 wherein the deletion processing unit has
  a first processing unit that randomly deletes one bundle from the plurality of bundles of detected values configuring the unit space, and
  a second processing unit that deletes, for detected values of an evaluation item determined in advance among the plurality of evaluation items, any one bundle, among bundles including detected values with highest frequency of appearance in the unit space or one bundle of two bundles between which a difference in detected value is smallest in the unit space, and
 wherein the deletion processing unit generates a random number, selects the first processing unit when the random number is equal to or smaller than a reference value set in advance and selects the second processing unit when the random number is larger than the reference value to cause the selected one to perform deletion processing.

2. The unit space update device according to claim 1, wherein the deletion processing unit sets the reference value such that a proportion in which the first processing unit is selected and a proportion in which the second processing unit is selected are in a predetermined ratio.

3. A unit space update method of updating a unit space, which is configured by a plurality of bundles of detected values for each of a plurality of evaluation items and serves as reference when calculating a Mahalanobis distance, the unit space update method comprising:

- a detected value acquiring step of acquiring a bundle of detected values detected in a constant cycle; and
- a deletion processing step of deleting one bundle from the plurality of bundles of detected values configuring the unit space so that, when adding the bundle of detected values to the unit space as a new bundle, the deleted one bundle is replaced with the new bundle,
- wherein the deletion processing step has
    - a first processing step of randomly deleting one bundle from the plurality of bundles of detected values configuring the unit space, and
    - a second processing step of deleting, for detected values of an evaluation item determined in advance among the plurality of evaluation items, any one bundle, among bundles including detected values with highest frequency of appearance in the unit space or one bundle of two bundles between which a difference in detected value is smallest in the unit space, and
- wherein the deletion processing step generates a random number, selects the first processing unit when the random number is equal to or smaller than a reference value set in advance and selects the second processing unit when the random number is larger than the reference value to cause the selected one to perform deletion processing.

4. A program stored on a non-transitory machine-readable storage medium, the program causing a computer of a unit space update device to update a unit space, which is configured by a plurality of bundles of detected values for each of a plurality of evaluation items and serves as reference when calculating a Mahalanobis distance, to function, the program causing the computer to execute:

- a detected value acquiring step of acquiring a bundle of detected values detected in a constant cycle; and
- a deletion processing step of deleting one bundle from the plurality of bundles of detected values configuring the unit space so that, when adding the bundle of detected values to the unit space as a new bundle, the deleted one bundle is replaced with the new bundle,
- wherein the deletion processing step has
    - a first processing step of randomly deleting one bundle from the plurality of bundles of detected values configuring the unit space, and
    - a second processing step of deleting, for detected values of an evaluation item determined in advance among the plurality of evaluation items, any one bundle, among bundles including detected values with highest frequency of appearance in the unit space or one bundle of two bundles between which a difference in detected value is smallest in the unit space, and
- wherein the deletion processing step generates a random number, selects the first processing unit when the random number is equal to or smaller than a reference value set in advance and selects the second processing unit when the random number is larger than the reference value to cause the selected one to perform deletion processing.

* * * * *